US012623371B2

(12) United States Patent
Piasentin

(10) Patent No.: US 12,623,371 B2
(45) Date of Patent: May 12, 2026

(54) INDUSTRIAL PLANT FOR PRODUCING AN ASSEMBLED FURNITURE ITEM

(71) Applicant: TECNO LOGICA S.R.L., Spresiano (IT)

(72) Inventor: Mirko Piasentin, Spresiano (IT)

(73) Assignee: TECNO LOGICA S.R.L., Spresiano (IT)

( * ) Notice: Subject to any disclaimer, the term of this patent is extended or adjusted under 35 U.S.C. 154(b) by 376 days.

(21) Appl. No.: 18/265,278

(22) PCT Filed: Dec. 4, 2021

(86) PCT No.: PCT/IB2021/061343
§ 371 (c)(1),
(2) Date: Jun. 5, 2023

(87) PCT Pub. No.: WO2022/130105
PCT Pub. Date: Jun. 23, 2022

(65) Prior Publication Data

US 2024/0025075 A1 Jan. 25, 2024

(30) Foreign Application Priority Data

Dec. 14, 2020 (IT) ........................ 102020000030770

(51) Int. Cl.
*B27M 3/18* (2006.01)

(52) U.S. Cl.
CPC .................................... *B27M 3/18* (2013.01)

(58) Field of Classification Search
CPC ........................................................ B27M 3/18
See application file for complete search history.

(56) References Cited

FOREIGN PATENT DOCUMENTS

| | | | |
|---|---|---|---|
| DE | 19654292 | A1 | 7/1998 |
| EP | 1342535 | A1 | 9/2003 |

OTHER PUBLICATIONS

English translation of DE 19654292 (Year: 1998).*
English translation of EP 1342535 (Year: 2003).*
International Search Report for PCT/IB2021/061343 Mailed Mar. 1, 2022.

* cited by examiner

*Primary Examiner* — Moshe Wilensky
(74) *Attorney, Agent, or Firm* — Rivka Friedman

(57) ABSTRACT

An improved factory method for producing a complete furniture item starting from panels that can be joined together, is described. The method steps are
picking up the set of panels divided into N sub-sets from a storage (10) of panels, N>=2,
bringing the N sub-sets of panels respectively to N workstations (54, 20 56, 64, 66, 68, 70, 72, 74) operating in tandem,
loading—e.g. simultaneously—a subset of panels in each N-th station, and preferably subject them to processing there;
transferring the panels of an Nth station to the next Nth station (54, 56, 64, 66, 68, 70), preferably for another processing,
transferring all the panels of the set from the last of the N stations to an assembly station (72) and assemble them there to obtain the shell or cabinet.

16 Claims, 3 Drawing Sheets

INDUSTRIAL PLANT FOR PRODUCING AN ASSEMBLED FURNITURE ITEM

BACKGROUND

The present invention relates to an industrial plant or factory for producing an assembled furniture item (also called a cabinet), or an assembled part of furniture such as a drawer, starting from individual panels. The present invention also relates to a method for producing the assembled cabinet.

The well-known industrial plants for the mass production of assembled furniture consist of one or more independent lines on which various machining operations (drilling, milling . . . and assembly operations) are carried out. Each line is characterized by a series of loading bays, hosting pallets from which panels are picked up and then processed individually in a sequential manner. As they pass through, the panels stop at various work workstations where they are processed and/or pre-assembled; see for example DE102007040386A1, DE102007035743A1 or DE102006036193A1. The final assembly of the panels to compose the cabinet takes place at the end of the line in a workstation (the so-called "bottleneck") manually fed with the last pieces.

Not only is the handling of panels toward and on the line laborious and time-consuming, but a panel put on the line is handled many times, at least at each workstation. This results in many tolerance errors and high lead time, which suffers especially from the final manual assembly in the bottleneck. Moreover, in order to process all panel sizes, the dimensioning of the conveyors is constrained to ensure the passage of the smallest parts.

The conveyors for supporting and handling the panel are movable and adapt to the width of the incoming material: they are very close when handling pieces of small widths and move away in the case of pieces of large widths. In the case of large pieces, this leads to inadequate support over the entire surface and to the onset of flexing during some machining operations (e.g. internal drilling), thus introducing critical issues in terms of time and quality in the machining execution.

Traditional lines, in order to guarantee high production capacities, are structured in such a way as to process similar product families. In the case of furniture there are lines dedicated to the realization of wall units rather than bases or columns, with the need then to recompose the orders by moving the cabinets from several different lines and conveying them to a common unloading area.

The absence of interconnection between lines, the nature of the lines themselves (dedicated to processing limited families of products) and the limitations in managing the dimensional variability of the panels to be processed (compromise between handling and processing), constitute one of the limits of traditional plants.

SUMMARY

The primary object of the invention is to improve upon the present state of the art.

Another object of the invention is to achieve an improved industrial plant for producing an assembled piece of furniture, or an assembled part of furniture such as a drawer, starting from individual panels.

These and other objects are achieved by what is set forth in the attached claims; advantageous technical features are defined in the dependent claims.

An aspect of the invention is a method of producing a furniture item constructed by in-line assembly of a set of panels that can be joined together to form a shell (of furniture or cabinet) that delimits a compartment, the set of panels comprising a ceiling panel, a bottom panel, a back panel, and two side panels, and optionally an intermediate shelf and/or linear guides and/or reinforcing strips, with the steps of

- picking up from a storage the set of panels divided into N subsets of panels, N>=2,
- bringing the N subsets of panels respectively to N workstations operating in tandem,
- loading—e.g., simultaneously—a subset of panels at each N-th workstation, and preferably subjecting them to a machining there;
- transferring the panels from an N-th workstation to the next N-th workstation, preferably for another machining,
- transferring all the panels of the set from the last of the N workstations to an assembly workstation and assembling them there to obtain the shell or cabinet.

Another aspect of the invention is an industrial plant for producing a furniture item built by in-line assembly of the aforementioned set of panels, comprising or consisting of

- a storage containing the set of panels,
- N workstations, N>=2, operating in tandem and configured
  - (i) to receive—e.g. simultaneously—from a line a subset of the panels and then pass them to the next workstation, and preferably
  - (ii) to machine the subset of panels;
- a line to transport a ceiling panel from the storage to one of the N workstations,
- a line to transport a bottom panel from the storage to one of the N workstations,
- a line to transport a back panel from the storage to one of the N workstations,
- a line to transport two side panels from the storage to one of the N workstations,
- a plurality of manipulators and/or conveyors for picking up a panel from a line and bringing it to a designated workstation of the N workstations;
- an assembly workstation downstream of the N workstations configured to receive all the panels of the set from the last of the N workstations (the one at the end of the chain/cascade of N workstations) and assemble them to obtain the shell or cabinet.

The above plant and method offer the advantage of carrying out the assembly automatically, i.e. without manual intervention, and in reduced times. When one of the N workstations has been loaded with one or more panels, they are gradually "added" to those already present on that workstation to gradually make up the complete cabinet to be assembled. That is, the panels loaded in the N-th workstation are arranged relatively to the panels already present in the N-th workstation (except for the first workstation, which is empty of panels). All the panels that form the complete furniture item (or part of a furniture item) to be assembled are added progressively through the N workstations, and progressively accumulate and "add up" together along the N workstations as the N workstations are loaded. Thus at the end of the N workstations there arrive all the panels needed to form the furniture item or part thereof, and are then transferred to the final assembly workstation that joins them together to form the complete assembled/mounted furniture item or part thereof.

Another advantage is that the N workstations are grouped into one (or more) automatic-workpiece-transferring machine(s) that combines, in a single production unit, the functions of a number of separate machines, unifying loading operations and transfer mechanisms.

All workstations preferably process different parts at the same time, and the pieces are transferred simultaneously from one workstation to another whenever all partial machining is completed (synchronous transfer system).

Preferably, a part is ready to be unloaded from the machine as soon as it has passed through all the workstations and all the necessary machining has been performed thereon.

Preferably, the parts are made to translate between workstations by means of systems which may be rotary or linear and are fixed in support structures which may be fixed or movable (jigs).

The loading of the new part to be machined and the unloading of the finished part is preferably done while the workstations are working on the parts already on the machine, so they are done in masked time.

Since the N workstations are preferably fed simultaneously with their respective panels, each N-th workstation is always running and there is no loss of cycle time. The speed of a said feed line is also higher, because the line can feed a downstream workstation that is constantly ready to receive the designated panels.

The plant and the method always have the huge advantage that the greater the structural complexity of the furniture item, the more efficient the plant is. If, for example, the furniture item is to be built with intermediate shelves or cantilevered racks that are parallel to the bottom panel and supported by the two side panels, the plant in practice does not slow down because of the greater complexity of the furniture item. It is only necessary that each N-th workstation loads a greater number of panels, which is possible because the parts loaded—and related loading operations—at an N-th workstation do not hinder the assembly of subsequent parts at the other N−1 workstations.

Below are preferred variants of the method.

In a variant, all the panels of the set are received from the last of the N workstations and are assembled to obtain the shell or cabinet. In a different variant,

- a subset of panels is received from the last of the N workstations,
- the missing panels of the set are received from a line, and
- all the received panels are assembled to produce the complete cabinet.

Preferably, all or some of the N workstations are arranged circularly (on a circumference) and a subset of panels is transferred from one of the N workstations to the angularly adjacent one by traversing an arc of the circumference.

Specifically, the assembly of the panels to form the complete furniture item occurs at a point on said circumference.

In a preferred variant, the N workstations are distributed on two (or more) distinct circumferences to form two or more circular series of workstations, and from the last workstation of the/a first circular series of workstation(s) a semi-finished product (constituted of a subset of the panels) is transferred to a workstation (e.g. the first but not necessarily) of the/a second circular series of workstation(s).

In a preferred variant, the processing and preparation and/or pre-assembly of the furniture item's side pieces takes place in the first circular series of workstations. In particular, in one or each workstation belonging to the first circular series of workstations A. a side panel is drilled, and/or
B. a side panel is milled, and/or
C. a drawer guide is mounted on a side panel, and/or
D. a reinforcing strip is mounted on a side panel, and/or
E. a pin or stud is mounted on a side panel, and/or
F. hardware is mounted on a side panel.

In general, at each workstation, machining is performed on a panel or a subset of panels. Preferably, each of the aforementioned steps A÷F takes place respectively at a single workstation of the sequence of workstations.

In a preferred variant, the machined sides of the furniture item are transferred from the last workstation of the first circular series of workstations to a workstation (e.g. the first but not necessarily) of the second circular series of workstations. Particularly, in the second circular series of workstations:

- a ceiling panel and a bottom panel are received in a workstation,
- guides or reinforcement strips are received in a(n) (optional) workstation,
- two machined side panels, left and right, are received in a workstation from the last workstation of the first circular series of workstations,
- a back panel is received at a workstation (and preferably here the back panel is stapled and the back panel is drilled for the installation of feet or sockets); and
- an assembled furniture item is unloaded at a workstation.

Preferably, after the assembly of the complete furniture item, the—in use—bottom surface of the bottom panel is machined, e.g. to obtain seats for feet or sockets.

Below are preferred variants of the plant.

In a variant, the assembly workstation is configured to receive from the last of the N workstations all the panels of the set and assemble them to obtain the shell or cabinet.

In a different variant, the assembly workstation is configured to

- receive from the last of the N workstations a subset of panels, and
- receive from a line missing panels of the set, and
- assemble all the received panels to produce the complete cabinet.

Whichever variant is used, the plant has the huge advantage that the greater the structural complexity of the furniture item, the more efficient the plant is. If, for example, the furniture item is to be built with intermediate shelves or cantilevered planes that are parallel to the bottom panel and supported by the two side panels, the plant in practice does not slow down because of the greater complexity of the furniture item. It is only necessary that each N-th workstation loads a greater number of panels, which is possible because the pieces loaded—and related loading operations—at an N-th workstation do not hinder the assembly of subsequent pieces at the other N−1 workstations.

Preferably, the N workstations are arranged circularly around a rotating member comprising N panel-gripping members arranged with polar symmetry around its rotation axis. The rotating member is configured to receive with each gripping member a subset of panels from one of the N workstations and pass it to the angularly adjacent one by means of a rotation of a fraction of a perigon. After one complete turn of the rotating member each of its gripping zones has arrived at each N-th workstation to collect all panels altogether and to pick up each subset of panels from a workstation and pass it to the next workstation in the circular sequence.

Once fully operational, each step of the turntable preferably corresponds to the loading of a blank and the unloading of a fully machined part.

In particular, the assembly workstation is one of the workstations arranged circularly around the rotating member.

For furniture items requiring panels with many machining steps, it is not possible or convenient to use a large number N of workstations on the same circumference. It is preferable to distribute the N machining workstations over two (or more) distinct circumferences, to form distinct circular series of workstations. Each circular series is concentric to a respective rotating member comprising, for example, N/2 panel-gripping members arranged with polar symmetry around the rotation axis of the rotating member. The rotating member is configured as described above.

With N workstations distributed e.g. on K circumferences (K>=2), the last workstation of a circular series of workstations outputs a semi-finished product that a manipulator or conveyor transfers to the first workstation of the next circular series of workstations, and so on.

In other words, for the preferred case K=2, the sequence of the first group of workstations generates a semi-finished product that feeds the input of the second group of workstations.

The furniture item's side panels often need to be equipped with drawer runners, reinforcing strips, drilled holes, dowels, or more. For certain furniture items, then, they require sophisticated and/or time-consuming machining. To solve this problem, it is convenient that the first circular series of workstations is dedicated to machining and preparing and/or pre-assembling the furniture item's sides.

In particular, one or each workstation belonging to a first circular series of workstations comprises means for

- drilling a side panel, and/or
- milling a side panel, and/or
- mounting a drawer guide on a side panel, and/or
- mounting a reinforcing strip on a side panel, and/or
- mounting a pin or dowel on a side panel, and/or
- mounting hardware on a side panel.

Specifically in a second circular series of workstations:

- a workstation comprises means for receiving a ceiling panel and a bottom panel,
- a workstation comprises means for receiving guides or reinforcing strips,
- a workstation comprises means for receiving two machined side panels, left and right, from the last workstation of the first circular series of workstations,
- a workstation comprises means for receiving a back panel (and preferably comprises means for stapling the back panel and drilling holes in the back panel for installing feet or sockets); and
- a workstation comprises means for unloading an assembled piece of furniture.

Preferably, the plant comprises only two circular series of workstations, the said first and second series.

Preferably, downstream of the assembly workstation, or internally to the assembly workstation, the plant comprises a device configured to machine the—in use—lower surface of the bottom panel, e.g. to obtain seats for feet or sockets. The lower surface is machined when the furniture item is all assembled, so cycle time and panel manipulations are saved.

Another aspect of the invention relates to an industrial plant for producing furniture items, or parts of furniture items such as a drawer, that make up a kitchen, the industrial plant comprising:

- two or more plants as defined above arranged to work in parallel,
- a delivery storage for
  - simultaneously receiving furniture items or parts of furniture items produced by the two or more plants, and
  - grouping them together to form the components of a desired kitchen.
- a handling line for bringing furniture items or parts of furniture items produced by each of two or more plants to a delivery storage.

Preferably, the storage containing the set of panels for the two or more plants is common to—and shared by—the two or more plants.

To improve the plant, a plant for assembling drawers by composing isolated panels is preferably placed in parallel with the two or more plants. The plant for assembling drawers may have a drawer output line towards the delivery storage or two or more output lines towards each said handling line. On each said handling line, there is e.g. a manipulator and/or robot and/or personnel to pick up a drawer from a drawer output line and insert it into a furniture item or cabinet arrived on a handling line.

The method and/or plant for drawers has merits in itself, and solves the problem of efficiently reproducing drawers by assembling panels. The method and/or plant for drawers can be implemented alone, without incorporation into the furniture item plant.

A method for producing the drawer envisages building it by in-line assembly of a set of panels that can be joined together to form a cabinet shell that encloses a drawer compartment, the set of panels comprising a bottom panel, a back panel, two side panels, a front panel, and optionally linear guides and/or reinforcing strips.

The method involves the following steps.

Said set of panels for drawer is picked up from a storage and divided into N subsets of panels for drawer, N>=2, then

- the N subsets of panels are brought respectively to N workstations operating in tandem,
- a subset of panels for drawer is loaded—e.g. simultaneously—at each N-th workstation, and preferably they are subject to machining there;
- the panels for drawer are transferred from an N-th workstation to the next N-th workstation, preferably for another machining,
- all the panels for drawer of the set are transferred from the last of the N workstations to an assembly workstation and there they are assembled to obtain the drawer.

Another aspect of the invention is an industrial plant for producing a drawer constructed by in-line assembly of the aforementioned set of drawer panels, comprising:

- a storage containing the set of panels for drawer,
- N workstations, N>=2, operating in tandem and configured to (I) receive—e.g. simultaneously—from a line a subset of the panels for drawer and then pass them to the next workstation, and preferably to (ii) machine the subset of panels for drawer;
- a line for transporting a front panel for drawer from the storage to one of the N workstations,
- a line for transporting a bottom panel for drawer from the storage to one of the N workstations,
- a line for transporting a back panel for drawer from the storage to one of the N workstations,
- a line for transporting two side panels for drawer from the storage to one of the N workstations,
- a plurality of manipulators and/or conveyors for picking up a panel for drawer from a line and bringing it to a designated workstation of the N workstations;

an assembly workstation downstream of the N workstations configured to receive all the panels for drawer of the set from the last of the N workstations (the one at the end of the chain/cascade of N workstations) and assemble them to obtain the composite drawer.

The plant and method for the drawer works similarly to that for the cabinet, and offer the advantages already described for the assembly of the furniture item.

In a variant, all the panels for drawer of the set are received from the last of the N workstations and they are assembled to obtain the drawer. In a different variant, a subset of panels for drawer are received from the last of the N workstations, the missing panels for drawer of the set are received from a line, and all the received panels are assembled to produce the complete drawer.

The N workstations defined in the method and plant for the drawer share the variants defined above for the plant for the cabinet, in particular the distribution over one or more circular series of workstations.

In a preferred variant, the processing and preparation and/or pre-assembly of the drawer front panel takes place in a first circular series of workstations. In particular, the first circular series comprises or consists of:

a workstation configured for receiving the front panel for drawer, a subsequent workstation configured for drilling holes in the drawer front panel, e.g., to create holes in which to mount longitudinal reinforcing rods and/or to insert hooks, and a subsequent workstation configured for drilling holes in the front panel for drawer to create holes in which to mount reinforcing plates and/or attachments for the assembly on the frame and/or the attachment for inserting the front panel on the drawer is inserted. and a subsequent workstation configured for unloading the machined front panel for drawer.

In a preferred variant, the machined front panel for drawer is transferred from the last workstation of the first circular series of workstations to the first workstation of a second circular series of workstations. Or, the machined front panel for drawer is transferred from the last workstation of the first circular series of workstations to a final assembly line, and the last workstation of a second circular series of workstations feeds with an assembled drawer frame the same final assembly line The drawer frame is formed by assembling the bottom panel, the back panel, and the two side panels.

Specifically, the second circular series of workstations comprises or consists of:

a workstation configured for loading and place the drawer back panel, a subsequent workstation configured for loading and place the right side panel for drawer, a subsequent workstation configured for loading and place the right side panel for drawer, a subsequent workstation configured for loading and place the bottom panel for drawer, a subsequent workstation configured for coupling the components loaded in the previous workstations to generate the assembled drawer frame, a subsequent workstation configured for transferring the pre-assembled frame to a final coupling line.

Drawer front panels often have to be fitted with holes, dowels, or hooks to the frame, which requires sophisticated and/or time-consuming machining. To solve this problem, it is convenient that the first circular series of workstations is dedicated to the machining and preparation and/or pre-assembly of the front panel of the drawer.

In particular, one or each workstation belonging to a/the first circular series of workstations comprises means for receiving the front panel, drilling holes in the front panel, e.g. to create holes for mounting longitudinal reinforcement rods and/or for inserting hooks, and drilling holes in the front panel to create holes in which reinforcement plates are to be mounted and/or hooks for assembly on the frame are to be mounted and/or the attachment, for inserting the front panel on the drawer, is inserted. and unloading the machined front panel.

Preferably, the plant for drawer comprises only two circular series of workstations, said first and second series.

Preferably the panels are wood panels and/or flat.

BRIEF DESCRIPTION OF THE DRAWINGS

Further advantages will become clear from the following description, which relates to an example of a preferred embodiment of plant in which.

DETAILED DESCRIPTION

Equal numbers in the figures indicate equal or substantially equal parts. To avoid crowding the drawings, sometimes equal elements are not numbered. Arrows indicate the movement direction of the material.

Figure 1:
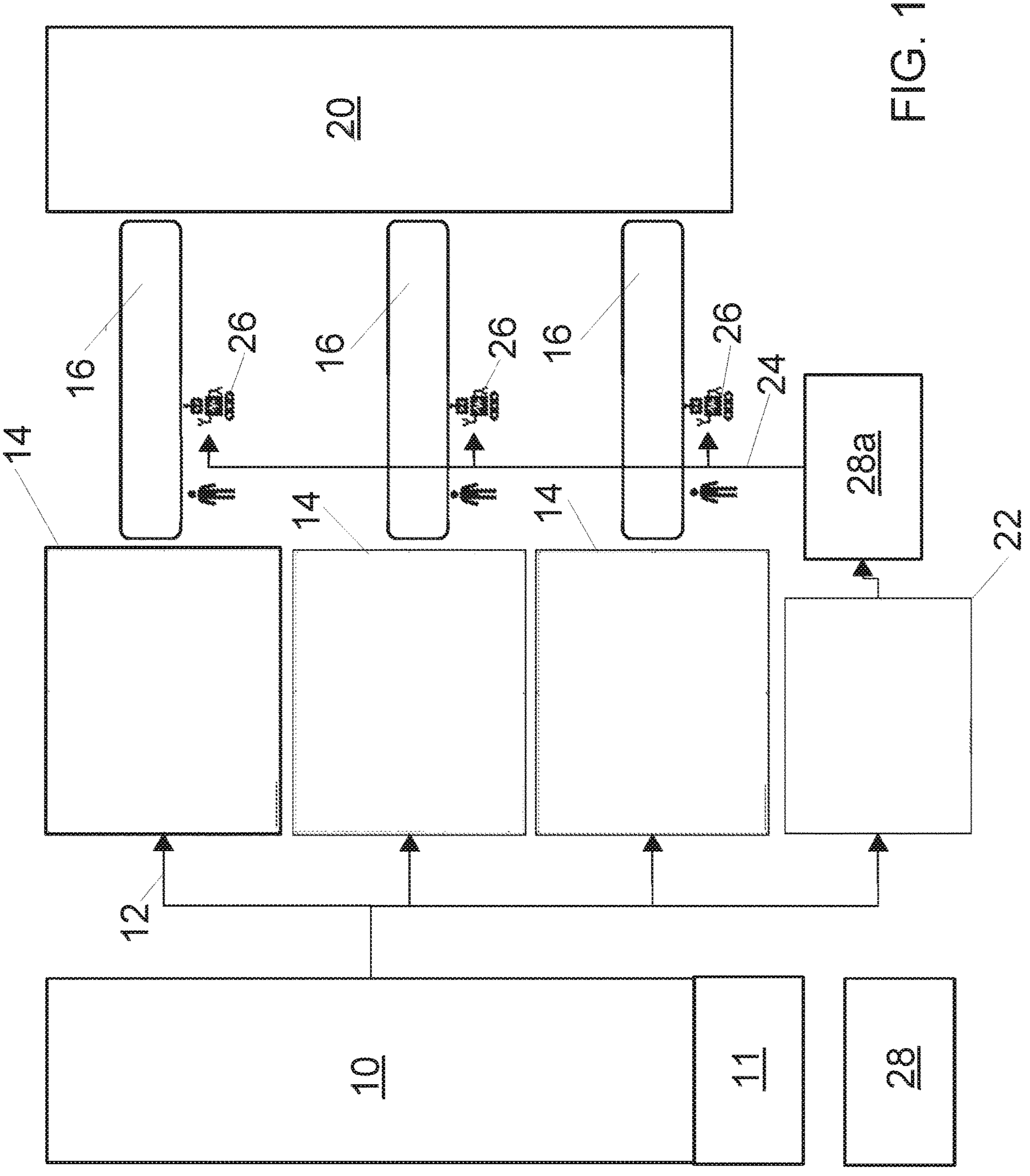
FIG. 1 shows a diagram of an industrial plant.

The plant of FIG. 1 comprises three equal plants 14 arranged to work in parallel and fed by a common storage 10, containing panels to form a cabinet, and by a common storage 11 containing hardware or accessories to be mounted on the furniture item.

The panels arrive at the plants 14 via feed lines 12, and are processed therein to generate an assembled and finished furniture item at the output, which is picked up from each plant 14 and brought to a common delivery storage 20 via dedicated handling lines 16.

The delivery storage 20 is structured to simultaneously receive the furniture items produced by the plants 14, and group them according to a program to compose a desired kitchen.

To improve the efficiency of the plant, a plant 22 is preferably installed in parallel with the plants 14 to assemble drawers by composing individual panels, e.g. taken from the storage 10. A storage 28 contains hardware or accessories to be assembled on the drawer, and feeds the plant 22. The plant 22 stores the produced drawers in an (optional) buffer storage 28*a*, from which a drawer output line 24 carries them to the handling lines 16, so that manipulators 26, located alongside each handling line 16, can pick up a drawer from the drawer output line 24 and insert it into a cabinet or furniture item that has arrived on a handling line 16. In this way, furniture items arrive in the delivery storage 20 with drawers already in it, e.g. by means of robotic cells for automatically inserting the drawer onto the assembled furniture item or cabinet. One or each handling line 16 may also be equipped for intervention by one or more operators to complete the assembly operations.

Figure 2:
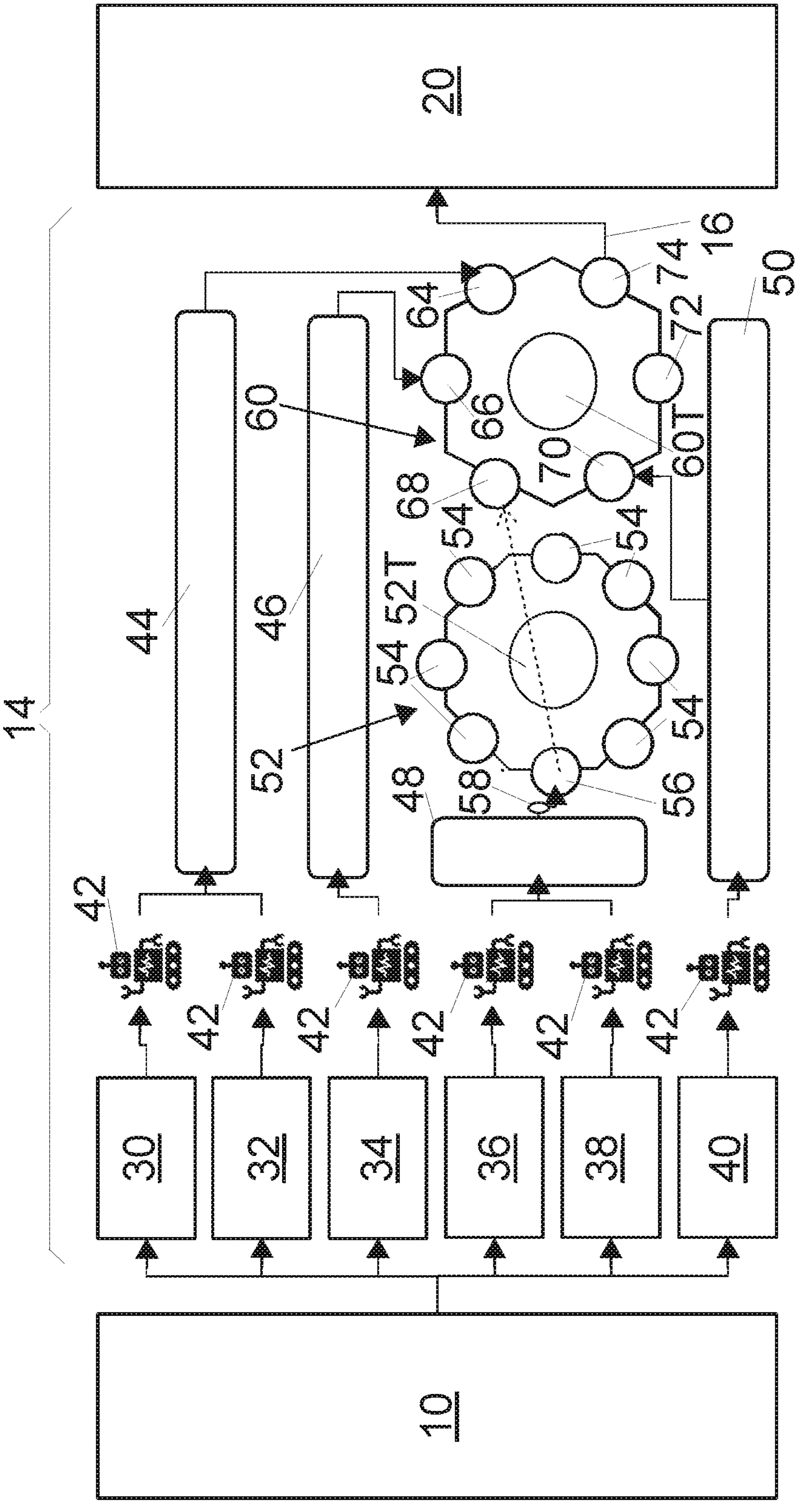
FIG. 2 shows a diagram of an industrial plant to produce furniture items.

A plant 14 is shown in more detail in FIG. 2.

In the illustrated example, the plant 14 is designed to produce a piece of furniture constituted by the assembly of a set of panels, which can be joined together to form e.g. a cabinet shell delimiting a compartment. In the illustrated example, the set of panels comprises e.g. a ceiling panel, a back panel, a bottom panel, two side panels, and preferably reinforcement strips (particularly applied to the back panel) and/or linear guides and/or horizontal shelves and/or hinges and/or flap mechanisms.

The various materials are taken from the storage 10 and arranged on different loading bays to reach machining centers.

With reference to FIG. 2, the storage 10 feeds via pallets a storage bay 30 for ceiling panels, a storage bay 32 for bottom panels, a storage bay 34 for reinforcement strips and/or linear guides, a storage bay 36 for the right side panels, a storage bay 38 for the left side panels, and a storage bay 40 for back panels.

To reach the bays 30, 32, 34, 36, 38, 40 in the example, the panels are stored in homogeneous stacks and moved on trolleys, and the hardware necessary for automatic assembly (guides for drawers, spacers, etc.) is placed inside stackable containers and placed on pallets. From the storage 10 depart e.g. a series of shuttles and/or a series of roller conveyors on which to load the material.

By means of manipulators or robots 42 the material on the bays 30, 32, 34, 36, 38, 40 is brought onto feed lines to feed two machining centers 52, 60 working in tandem, i.e. the output of the machining center 52 is an input of the machining center 60.

In particular, the machining center 52 (60) comprises a central table 52T (60T), rotatable about a vertical axis, which by rotating can move the work pieces to be machined between various work workstations 54 (62) arranged circularly and coaxially around the table 52T (60T).

In particular, the machining center 52 only processes side panels, and receives as input material a side panel for the right side and a panel for the left side and various accessories such as, for example, hinge plates, fixing hooks, basket or runners for drawer, and door flaps.

Among the various workstations 54 some workstations are indicated with a different reference:

a workstation 56 receives two side panels, a right side panel and a left side panel, from a loader 48, fed by bays 36, 38 and a manipulator or robot 42, and the same workstation 56 unloads the two machined side panels, left and right, to a workstation of the center 60.

The loader 48 is e.g. formed of an overhead rocker-arm conveyor that transfers right and left sides to a loading/unloading manipulator. The overhead conveyor preferably transfers the rocker-arms, each containing right and left sides belonging to the same cabinet or furniture item, to an (optional) contour-checking workstation. In this position, the right and left side panel contour-check is carried out to assess the correctness of the material loading according to the required sequence. In the event of an incorrect sequence, the material skips the loading/unloading manipulator to return to the loading area of the anthropomorphic robots and is unloaded from the line. The material that successfully passes the contour check arrives to a retractable-arm manipulator 58 that simultaneously picks up the left and right side panels from a rocker-arm and transfers them to a loading/unloading workstation 56 of the center 52. From the same workstation 56, the manipulator 58 transfers the machined side panels to a conveyor (not shown) to feed the input of the machining center 60.

Internal components (e.g. door hinges) also arrive at the machining center 52, feeding some of the workstations thereof. Each workstation is served by an anthropomorphic robot equipped with a gripper and configured to pick up the components.

The table 52T comprises vertical supports, with for example grippers and/or arms equipped with suction cups and in particular rotatable about a vertical axis, to receive the two side panels and fix them to it during rotation and passage through the workstations 54 until unloading at the workstation 56. In this way, subsequent centering is not necessary and the necessary rigidity of the panel support is always ensured, to counteract the thrust of the machining spindles at the workstations 54, 56.

Specifically, each vertical support is configured for receiving and machine the left and right side panels simultaneously.

For example, the machining operations at the workstations of the machining center 52 are sequentially:

workstation 56: left and right side panel loading/unloading;

next workstation 54: drilling left and right side panel;

next workstation 54: drilling left and right side panel;

next workstation 54: left and right side panel milling;

next workstation 54: mounting of hinge plates and screwing;

next workstation 54: rail mounting and screwing;

next workstation 54: rail mounting and screwing;

workstation 56: flap assembly and screwing.

The panel is unloaded from the workstation 56 after a complete turn of the table 52T, after it has passed through all workstations 54 and undergone all necessary machining, and reaches a workstation 68 of the center 60 (see dashed arrow).

In particular, the machining center 60 is responsible for machining the panels other than the side panels, and for assembling the various panels and components together to form the furniture item.

Like the center 52, the center 60 is composed of workstations, six in the example, each of which performs a portion of the operations necessary to close the furniture item. Pieces are transferred simultaneously from one workstation to another each time all partial machining is completed. The piece is unloaded from the center 60 at the moment it has passed through all the workstations. The work pieces pass through all workstations thanks to the rotation of the rotary column 60T, which is equipped with support structures like the column 52T.

The loading of a new piece to be machined and the unloading of the finished piece takes place while the intermediate workstations process pieces that have already been loaded. The material exiting the center 60 is the assembled furniture item.

Specifically, to the input of the center 60 there converge:

the ceiling panel, the bottom panel, and fixed machined shelves coming from processing line, reinforcement strips, left and right side panels machined by the center 52, back panels (e.g. coming from the storage via overhead conveyor), protective strips.

The workstations are (in the counterclockwise direction of the machining sequence):

a workstation 64 receives a ceiling panel and a bottom panel from a loader 44, fed by the bays 30, 32 and a manipulator or robot 42, a workstation 66 receives guides or reinforcing strips from a loader 48, fed from the bay 34 and a manipulator or robot 42, a workstation 68 receives two machined side panels, left and right, from the workstation 56 of the center 52, a workstation 70 receives a back panel from a loader 50, fed from the bay 40 and a manipulator or robot 42 (e.g., coming from the storage via an overhead conveyor equipped with rocker-arms);

a workstation 72 where the panels are assembled together to compose the compartment, and preferably the back panel is stapled and the bottom panel is drilled for installation of feet or sockets;

a workstation 74 unloads an assembled furniture item on a line 16. For example, at the workstation 74, protective strips are mounted on the outside of the bottom panel.

The table 60T comprises supports, with, for example, clamps and/or arms equipped with suction cups, for receiving panels and accessories from outside the center 60 and securing them to it. As the table rotates and passes through the workstations 64, 66, 68, it acquires from the outside more and more panels and/or accessories for the furniture item, and machines them at the workstations 64, 66, 68, 70.

In an advantageous variant, the ceiling and bottom panels are machined in a workstation (not shown) before being fed into the center 60, e.g. to be drilled and dowel insertion.

Figure 3:
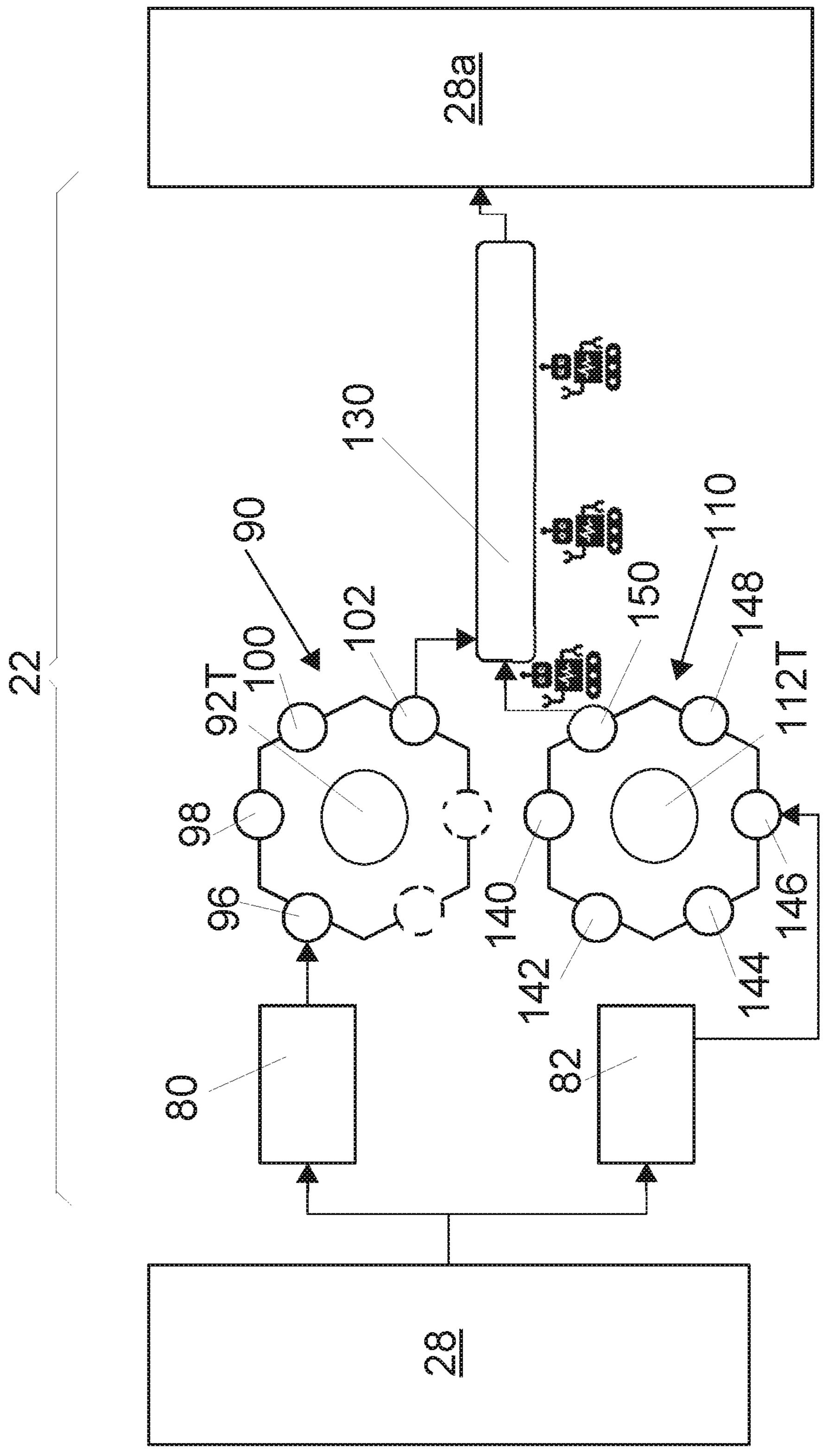
FIG. 3 shows a diagram of an industrial plant to produce drawers for furniture items.

The plant 22 is shown in more detail in FIG. 3,

In the illustrated example, the plant 22 is designed to produce a drawer consisting of the assembly of a set of panels, which can be joined together to form a cabinet shell delimiting a storage compartment. The set of panels comprises, for example, a front panel, a bottom panel, a back panel, two side panels (left and right), and reinforcing strips and/or linear guides and/or reinforcing rods (left and right) mounted between the front panel and the back panel.

In the drawer, the back panel and two side panels can be made of metal.

The various materials are taken from the storage 28 and arranged on different loading bays to reach machining centers.

The storage 10 feeds via pallet a storage bay 80 for the front panels, and a storage bay 82 for bottom panels.

By means of manipulators or robots, the material on the bay 80 is brought to a machining center 90, while the material on the bay 82 is brought to a machining center 110.

In particular, the machining center 90 (110) comprises a central table 92T (112T), rotatable about a vertical axis, which by rotating can move the workpieces to be machined between various workstations arranged circularly and coaxially around the table 92T (112T).

The table 92T and/or 112T is made e.g. like the table 52T or 62T.

For example, the centers 80, 110 can work in tandem, i.e. the output of the machining center 90 is an input of the machining center 110. Or (as in. FIG. 3) the centers 80, 110 work in parallel and both feed a final coupling line 130. wherein a pre-assembled front panel is coupled to the pre-assembled frame.

On or downstream of the line 130, a previously oriented reinforcing rod is also inserted on a percentage of drawers.

The drawers with and without reinforcement rod are then conveyed to automatic lines for the automatic insertion (by anthropomorphic robot) of the drawers inside the furniture item.

In particular, the machining center 90 only deals with machining the front panels. Among its various workstations, some workstations in tandem are indicated with a different reference:

a workstation 96 receives the front panel, and a workstation 98 drills holes in the front panel, e.g. to create holes in which to mount longitudinal reinforcement rods and/or to insert hooks, and a workstation 100 drills holes in the front panel to create holes in which to mount reinforcing plates and/or attachments for assembly on the frame and/or the attachment, for inserting the front panel on the drawer, is inserted, and a workstation 102 unloads the machined front panel.

Specifically, the machining center 110 is responsible for assembling panels together to generate an assembled drawer frame. The various workstations (in the example, six) are:

a workstation 140 loads and places the back panel of the drawer, a workstation 142 loads and places the right side panel, a workstation 144 loads and places the right side panel, a workstation 146 loads and places the bottom panel, a workstation 148 couples the components loaded by the previous workstations to generate an assembled drawer frame, a workstation 150 transfers the pre-assembled frame to the final coupling line 130.

It is understood that each workstation in the center 110 is fed by a line, although not illustrated for simplicity. As variants, each workstation 90, 110, 52, 60 may also have a different number or type of workstations, shown e.g. in FIG. 3 in dashed line, and/or integrate the functions or machining described above for two or more workstations into one workstation, or distribute over two or more workstations the functions or machining described above for one workstation.

The invention claimed is:

1. A method for producing a furniture item by in-line assembling a set of panels that can be joined together to form a shell or cabinet delimiting a compartment, the set of panels comprising a top or ceiling panel, a bottom panel, a back panel, and two side panels, the method comprising the steps of picking up from a storage a panel set divided into N sub-sets of panels, N >=2;

bringing the N sub-sets of panels respectively to N workstations operating in series arrangement, namely wherein an output of a workstation is an input of a workstation next in series up to a last workstation of said series arrangement;

loading and machining at least one of the N sub-sets of panels at each of the N workstations;

transferring accumulated panels from a current workstation to a subsequent workstation in said series arrangement for another machining operation;

transferring all the accumulated panels of the panel set from a last of the N workstations to an assembly station, and assembling the accumulated panels at the assembly station to obtain the shell or cabinet.

2. The method according to claim 1, wherein at least some or all of the N workstations are circularly arranged on a circumference and each of the sub-sets of panels is transferred from one of the N workstations to the angularly adjacent subsequent workstation along an arc of circumference.

3. The method according to claim 2, wherein the assembly of the accumulated panels to form the complete furniture item takes place at a point on the circumference.

4. The method according to claim 2, wherein the N workstations are distributed on two or more distinct circumferences to form two or more circular series of workstations, and from a last workstation of a first circular series of workstations a semi-finished product, consisting of a subset of panels, is transferred to a workstation of a second circular series of workstations.

5. The method according to claim 4, wherein machining and preparation and/or pre-assembly of sides of the furniture item takes place only in the first circular series of workstations, and processed sides of the furniture item are transferred from the last workstation in the first circular series of workstations to a workstation in a second circular series of workstations.

6. The method according to claim 5, wherein in the second circular series of workstations:

a ceiling panel and a bottom panel are received in a first workstation, two machined side panels, right and left, are received in a second workstation from the last workstation of the first circular series of workstations, a back panel is received in a third workstation, the shell or cabinet is assembled in a fourth workstation, and the shell or cabinet is unloaded in a fifth workstation.

7. The method according to claim 1, wherein the shell or cabinet is transferred on a line and an assembled drawer, which is produced by drawer workstations working in parallel to said N workstations and assembling a set of drawer panels, is inserted in the shell or cabinet.

8. The method according to claim 7, wherein at least some or all of the drawer workstations are arranged circularly on a circumference, and a subset of drawer panels is transferred from one of the N workstations to the angularly adjacent one by travelling an arc of circumference.

9. The method according to claim 7, wherein the drawer workstations are distributed on two or more distinct circumferences to form two or more circular series of workstations;

and from a last workstation of a first circular series of workstations a semi-finished product consisting of a machined drawer front panel, is picked;

and from a last workstation of a second circular series of workstations a machined drawer frame comprising the assembly of a bottom panel, a back panel and two side panels, is picked.

10. The method according to claim 9, wherein the semi-finished product consisting of a machined drawer front panel and the machined drawer frame are assembled together downstream of the circular series of workstations.

11. The method according to claim 3, wherein the semi-finished product consisting of a machined drawer front panel and the machined drawer frame are assembled together downstream of the circular series of workstations.

12. The method according to claim 11, wherein the machining and preparation and/or pre-assembly of the sides of the furniture item takes place only in the first circular series of workstations, and the processed sides of the furniture item are transferred from the last workstation in the first circular series of workstations to a workstation in a second circular series of workstations.

13. The method according to claim 12, wherein in the second circular series of workstations:

a ceiling panel and a bottom panel are received in a first workstation, two machined side panels, right and left, are received in a second workstation from the last workstation of the first circular series of workstations, a back panel is received in a third workstation, the shell or cabinet is assembled in a fourth workstation, and the shell or cabinet is unloaded in a fifth workstation.

14. The method according to claim 8, wherein the drawer workstations are distributed on two or more distinct circumferences to form two or more circular series of workstations, and from the last workstation of a first circular series of workstations a semi-finished product consisting of a machined drawer front panel is picked and from the last workstation of a second circular series of workstations a machined drawer frame comprising the assembly of a bottom panel, a back panel and two side panels is picked.

15. The method according to claim 14, wherein the semi-finished product consisting of a machined drawer front panel and the machined drawer frame are assembled together downstream of the circular series of workstations.

16. The method according to claim 1, wherein the set of panels comprises an intermediate shelf and/or linear guides and/or reinforcement strips.

* * * * *